United States Patent
Richard et al.

(10) Patent No.: US 10,180,264 B2
(45) Date of Patent: *Jan. 15, 2019

(54) METHOD AND APPARATUS FOR ATTACHING FLANGE PORTIONS TO DUCTS

(71) Applicant: RAM Developing LLC, North Windham, CT (US)

(72) Inventors: Alain Denis Richard, North Windham, CT (US); Richard Carl Houle, Chaplin, CT (US); Michael Paul Houle, Columbia, CT (US)

(73) Assignee: RAM Developing LLC, North Windham, CT (US)

( * ) Notice: Subject to any disclaimer, the term of this patent is extended or adjusted under 35 U.S.C. 154(b) by 430 days.

This patent is subject to a terminal disclaimer.

(21) Appl. No.: 14/947,743

(22) Filed: Nov. 20, 2015

(65) Prior Publication Data

US 2016/0076787 A1 Mar. 17, 2016

Related U.S. Application Data

(63) Continuation of application No. 11/779,786, filed on Jul. 18, 2007, now Pat. No. 9,212,770.

(51) Int. Cl.
| | |
|---|---|
| *F16L 23/14* | (2006.01) |
| *F24F 13/02* | (2006.01) |
| *F16B 25/10* | (2006.01) |
| *F16L 23/16* | (2006.01) |

(52) U.S. Cl.
CPC ........ *F24F 13/0209* (2013.01); *F16B 25/106* (2013.01); *F16L 23/14* (2013.01); *F16L 23/162* (2013.01); *F16B 25/10* (2013.01)

(58) Field of Classification Search
CPC .................................. F16L 23/14; F16L 23/12
See application file for complete search history.

(56) References Cited

U.S. PATENT DOCUMENTS

| | | | |
|---|---|---|---|
| 641,580 | A | 1/1900 | Cummins |
| 1,450,826 | A | 4/1923 | Walten |
| 2,369,697 | A | 2/1945 | Werkenthin et al. |
| 3,010,353 | A | 11/1961 | Psaros |
| 3,018,120 | A | 1/1962 | Vann |

(Continued)

FOREIGN PATENT DOCUMENTS

| | | |
|---|---|---|
| CA | 2122847 | 11/1995 |
| EP | 47467 | 9/1981 |

(Continued)

OTHER PUBLICATIONS

"Sleeves for Fire Dampers—Sleeve Installation Instructions," Hart & Cooley, Inc., 2003.

(Continued)

*Primary Examiner* — Aaron M Dunwoody
(74) *Attorney, Agent, or Firm* — O'Shea Getz P.C.

(57) ABSTRACT

A flange to be assembled to a duct member includes a plurality of pre-fabricated apertures or areas of weakened wall strength for receiving fasteners to assemble the flange to the end of a duct member. The apertures may be spaced apart such that the fasteners can be inserted at regular intervals along the length of the flange and the length of the end of the duct member.

19 Claims, 7 Drawing Sheets

(56) References Cited

U.S. PATENT DOCUMENTS

| | | | |
|---|---|---|---|
| 3,199,901 A * | 8/1965 | Jeppsson | F16L 23/14 138/159 |
| 3,415,543 A * | 12/1968 | Keating | F16L 13/002 285/24 |
| 3,712,650 A * | 1/1973 | Mez | F16L 23/14 285/405 |
| 3,923,326 A | 12/1975 | Mez | |
| 4,252,350 A | 2/1981 | Smitka | |
| 4,283,080 A | 8/1981 | Nakajima | |
| 4,288,115 A * | 9/1981 | Sullivan | F24F 13/0209 285/363 |
| 4,304,423 A * | 12/1981 | Mez | F24F 13/0209 285/288.4 |
| 4,410,206 A | 10/1983 | Mez | |
| 4,447,079 A | 5/1984 | Sullivan | |
| 4,537,430 A * | 8/1985 | Sullivan | F24F 13/0209 285/364 |
| 4,542,923 A | 9/1985 | La Crosse et al. | |
| 4,552,388 A | 11/1985 | Meinig | |
| 4,558,892 A * | 12/1985 | Daw | F24F 13/0209 285/331 |
| 4,564,227 A | 1/1986 | Murck | |
| 4,725,083 A | 2/1988 | Schauer | |
| 4,861,631 A | 8/1989 | Hinden et al. | |
| 4,940,264 A | 7/1990 | Mez | |
| 5,015,018 A * | 5/1991 | Arnoldt | F16L 23/08 285/367 |
| 5,054,823 A | 10/1991 | Arnoldt | |
| 5,103,872 A | 4/1992 | Jyh-Long | |
| 5,129,690 A * | 7/1992 | Meinig | F16L 23/08 285/363 |
| 5,133,580 A | 7/1992 | Meinig | |
| 5,135,270 A | 8/1992 | Arnoldt et al. | |
| 5,165,736 A | 11/1992 | De Waal | |
| 5,199,747 A * | 4/1993 | Jahr | F16L 25/08 138/DIG. 4 |
| 5,352,000 A | 10/1994 | Issagholian-Havai et al. | |
| 5,429,116 A | 7/1995 | Brown | |
| 5,448,815 A * | 9/1995 | Kolesar | F16L 23/14 29/243.5 |
| 5,494,244 A | 2/1996 | Walton | |
| 5,621,956 A * | 4/1997 | Kolesar | F16L 23/14 29/243.5 |
| 5,687,514 A | 11/1997 | Gillispie | |
| 5,703,892 A | 12/1997 | Claisse et al. | |
| 5,983,496 A | 11/1999 | Hermanson | |
| 6,109,665 A * | 8/2000 | Meinig | F24F 13/0209 285/365 |
| 6,301,781 B1 | 10/2001 | Hermanson | |
| 6,561,553 B1 * | 5/2003 | Issagholian-Havai | F16L 23/14 285/405 |
| 7,029,037 B2 | 4/2006 | Poole | |
| 7,163,030 B2 * | 1/2007 | Hermanson | B21C 37/155 138/155 |
| 7,195,290 B2 | 3/2007 | Duffy | |
| 7,216,898 B1 | 5/2007 | Hermanson | |
| 7,429,020 B2 | 9/2008 | Huebner et al. | |
| 2002/0067950 A1 | 6/2002 | Price et al. | |
| 2002/0094233 A1 | 7/2002 | Price et al. | |
| 2004/0033105 A1 | 2/2004 | North | |
| 2005/0116470 A1 | 6/2005 | Duffy | |
| 2007/0204549 A1 | 9/2007 | Gerome | |
| 2009/0022569 A1 * | 1/2009 | Richard | F16L 23/14 411/508 |
| 2017/0276273 A1 * | 9/2017 | Yoskowitz | F16L 23/14 |

FOREIGN PATENT DOCUMENTS

| | | |
|---|---|---|
| EP | 354627 | 8/1989 |
| EP | 441570 | 2/1991 |

OTHER PUBLICATIONS

"Ward Installation—Sleeve Installation Instruction for use with all series fire dampers," Ward Industries, p. 590.4, Jul. 22, 2004, www.wardind.com.
"Ward Component—Solid, Slotted and Punched Angle," Ward Industries, p. 551, Nov. 9, 2004, www.wardind.com.
"Ruskin—FAST and PFMA," Ruskin, 2002.
"Prefco—Supplemental Installation Instructions for EZ Mount Retaining Angles for use on 5000, 5500, & 5600F Series Dampers," Perfect Air Control, Inc., Jun. 2004, www.prefco-hvac.com.
"Model FRA Framed Retaining Angles for U.L. Fire Damper Installations," NCA Manufacturing, Inc., 1999.
"'Quick-Set' Retaining Angles for all Sleeved Fire and Combination Fire/Smoke Dampers, Models QS1 and QS2," Nailor Industries, Inc., Jun. 5, 2003.
"Cost Saving Model WAA—Wrap Around Angles," Leader Industries, Inc., Jun. 1997, www.leaderindustries.com.
"Ward Connector—J Flange and H Flange SMACNA Rated "J" and "H" Transverse Joint Duct Connectors," Ward Industries, p. 530, Oct. 26, 2004, www.wardind.com.
"Punched Angle—Fire Damper Mounting Angle," C.L. Ward & Family Inc., 2003, www.cl.ward.cin.
"A Critical Project", Snips Magazine, vol. 9, No. 1, Jan. 2010.
"Ward Connector—Quick J Flange and Quick J Flange", Ward Industries, Jul. 9, 2009, www.wardind.com.
"Ward Industries Quick Flange Demonstration", www.youtube.com/watch'?v=roK6mYi07Pg, Jun. 2, 2000.
"Repeater Pro", Ductmate Industries, Inc., www.ductmate.com, Feb. 2011.
Audio transcript and Screenshots from "Ward Industries Quick Flange Demonstration", www.youtube.com/watch?v=roK6mYi97Pg, Jun. 2, 2009.

\* cited by examiner

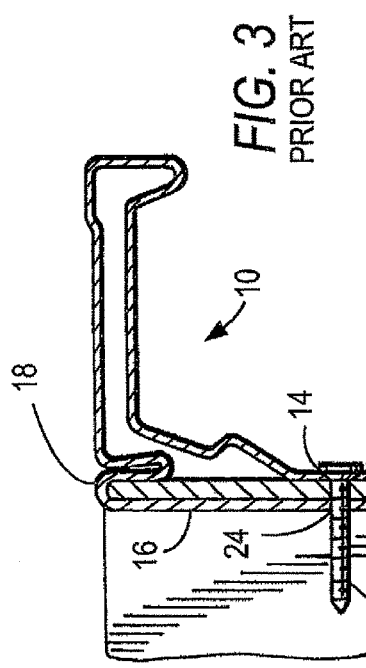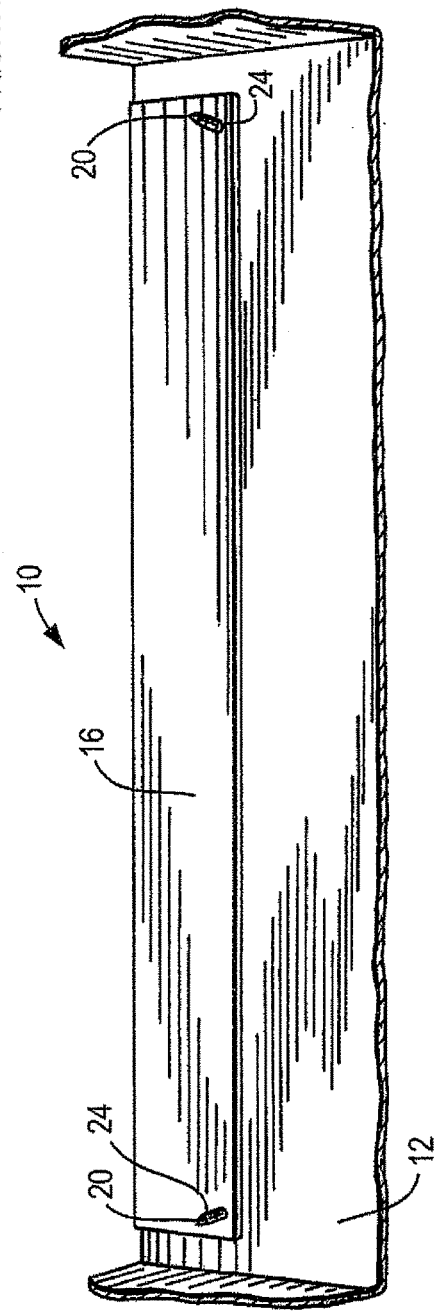

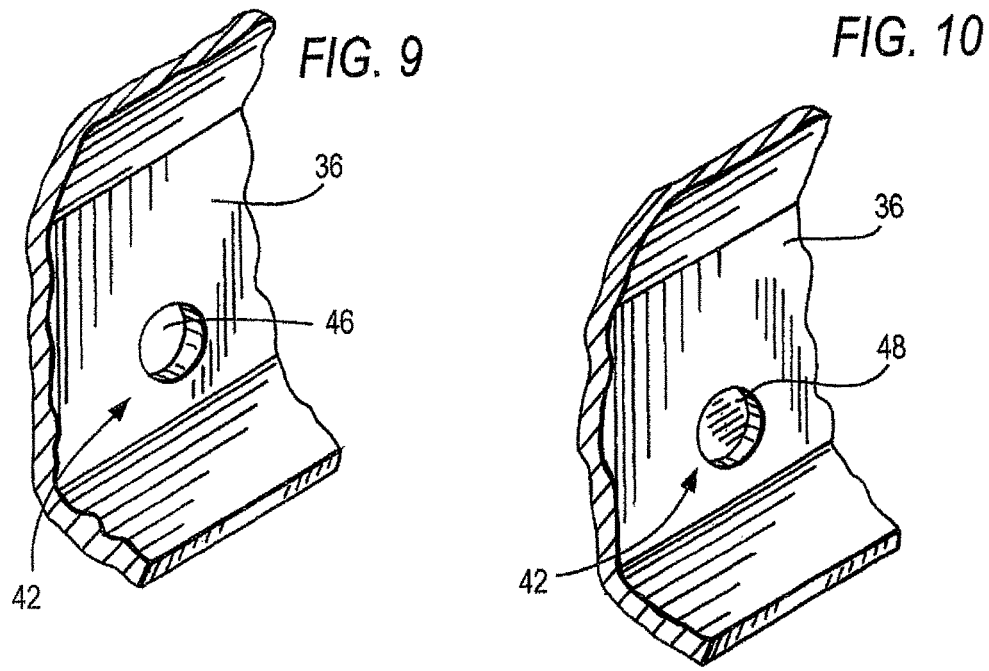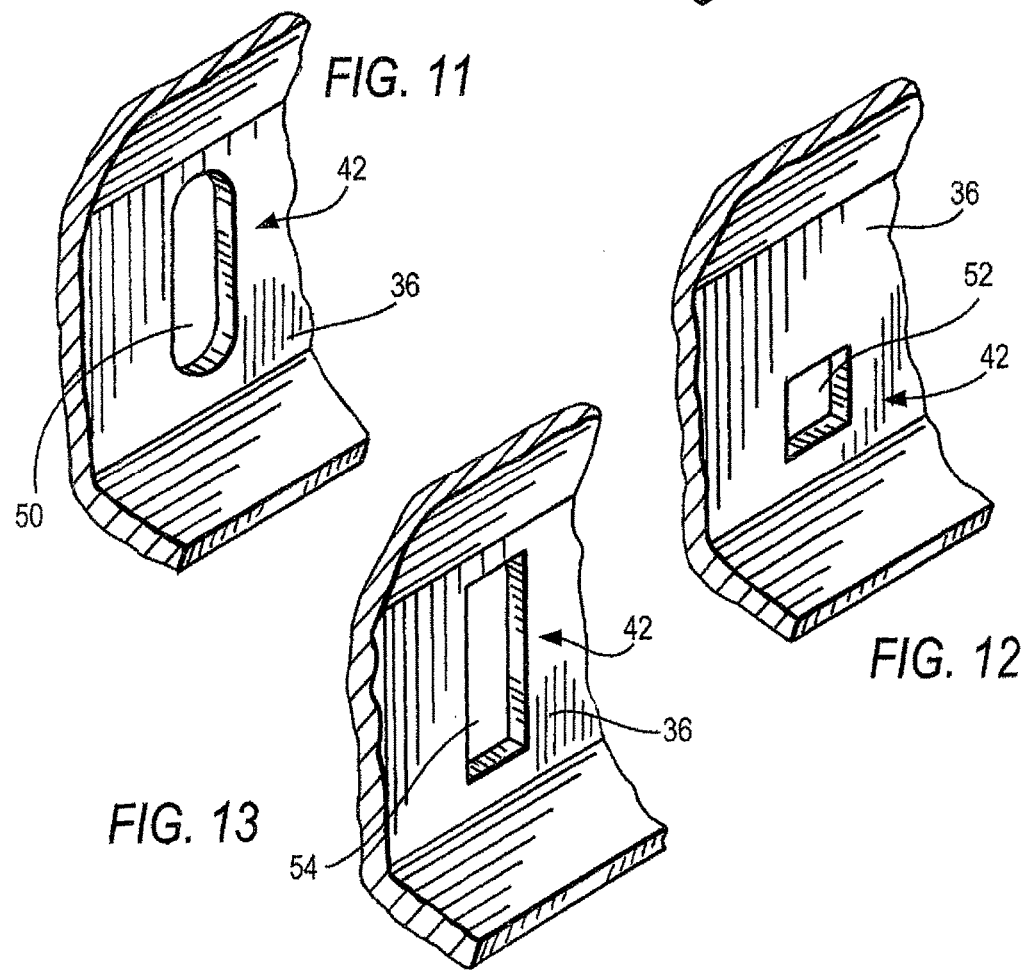

METHOD AND APPARATUS FOR ATTACHING FLANGE PORTIONS TO DUCTS

This application is a continuation of U.S. patent application Ser. No. 11/779,786 filed Jul. 18, 2007, the disclosure of which is herein incorporated by reference.

BACKGROUND OF THE INVENTION

1. Field of the Invention

This invention relates to ducts, and in particular to attaching flange portions to duct members for interconnecting duct members.

2. Description of the Related Art

Ducts and duct work are formed by securely interconnecting duct members and other components such as flanges using fasteners. Various arrangements have been suggested to facilitate the joining. Example devices and methods for such interconnections are shown in U.S. Pat. Nos. 4,288,115; 4,564,227; 4,725,083; 5,103,872; and 5,621,956. In general, they do not most advantageously address issues inherent with material handling, part manipulation, and the ease of assembly, particularly given the often difficult orientation of assembler to workpiece encountered in the installation of a ductwork system. The present invention overcomes these deficiencies by the use of a pre-selected array of depressions or openings in the flanges which permit ready joining.

U.S. Pat. No. 4,288,115 to Sullivan describes a duct jointing system with hollow flange members on the ends of ducts, and having a snap-on cleat for fastening abutting flange members together. A corner portion is shown to have holes in legs, but such holes do not receiving fastener.

U.S. Pat. No. 4,564,227 to Murck provides a flanged duct joint with snap-in corner pieces having legs which fit into two abutting flanges to assemble the flanges in a joined configuration.

U.S. Pat. No. 4,725,083 to Schauer discloses a flanged joint having walls on flanges shaped for receiving corner pieces. The abutting flanges are joined together by bolting complementary bores in the corner pieces. Depressions in the flange walls are oriented to receive complementary projections from the corner pieces in a friction fit, but the depressions are not and cannot be used to fasten complementary flanges together, since walls of the flanges are interposed between the depressions of the abutting flange walls.

U.S. Pat. No. 5,103,872 to Jyh-Long discloses a flanged joint with abutting flanges retained together by flange clamps and by bolts fastening corner pieces together. The flange strip elements have projections for engaging raised projections on the end portions of the ducts, but not the abutting flange.

U.S. Pat. No. 5,621,956 to Kolesar has flange members with screws inserted for attaching the flange members to the ends of ducts. Bolts pass through bolt holes in the corner pieces attached to the flanges for fastening abutting corner pieces and thus assembling the flanges and duct sections.

As noted, these prior art teachings present complicated arrangements for securing flanges to the ends of ducts and/or for interconnecting duct members, and such arrangements typically require additional components which make the interconnections more expensive to implement.

Another prior art method for interconnecting duct members, which is being commercially practiced, is shown in FIGS. 1-6, in which multiple layers of sheet metal are placed in juxtaposition, and apertures are created through which joining members are secured. As illustrated, a flange 10 is placed adjacent to an end portion 12 of a duct member. The flange 10 includes at least one wall member 14. The flange 10 includes a pair of wall members 14, 16 joined by an intermediate member 18, with the wall members 14, 16 placed on the duct member such that each wall member 14, 16 is adjacent to opposite sides of the end portion 12.

To secure the flange 10 to the duct member, a fastener 20 is placed adjacent to one of the wall members 14, 16, preferably the wall member adjacent to the exterior surface of the duct member, such as the wall member 14 shown in FIG. 2. A tool 22, such as a drill, or alternatively a repeater tool or gun, is used to provide pressure and optionally a drilling force to the fastener 20 in the direction of the arrow shown in FIG. 2, in order to create apertures 24 in both the flange 10 and the end portion 12 of the duct member, as shown in FIG. 3. In one embodiment, the fastener 20 may be a screw for serving both as a tool workpiece to create the apertures 24 and to function as the inserted fastener 20 after insertion by the tool 22.

In the fastened configuration of FIGS. 3-4, the fastener 20 passes through the apertures 24 to secure the flange to the duct member in the assembled configuration, allowing the flange 10 to join other flanges or components, such that the duct member connected to the flange 10 is positioned and assembled to other duct members, as required.

Although extensively used, this prior art insertion method has numerous disadvantages. For example, by requiring the fastener 20 to pass through multiple solid layers of material; that is, the wall members 14, 16 as well as the end portion 12, each formed of sheet metal, the assembler using the tool 22 must apply significant pressure to the fastener 20 to pierce three layers of metallic material. In addition, if the tool 22 is a drill or other device for applying a rotational force as well as a longitudinal insertion force in the direction of the arrow in FIG. 4, the assembler will experience significantly higher counter-torque as the fastener 20 passes through multiple layers 12-16 of material. These higher pressures and torques reduce the efficiency of insertion of the fastener 20 to join the flange 10 to the duct member, and may also cause injury to the assembler.

Furthermore, as the fastener 20 passes through the flange 10 and the end portion 12, debris at the insertion point from the formed apertures will be positioned between the flange 10 and the end portion 12. Thus, the assembled flange 10 and the end portion 12 often does not have a very tight fit in the final assembly.

Moreover, it is not uncommon that the insertion pressure applied to the fastener 20 typically causes one wall member of the flange and/or the portion of the duct member to bend away from the direction of insertion, and so causing push-out of the components from their original shape, as shown in FIGS. 5-6. The improperly pushed-out, or alternatively pushed in, and bent flange 26 has an outer wall member 28 and a push-out wall member 30 joined at a bend 32, with the distorted shape of the flange 26 caused by the force of the fastener 20 conveying the insertion pressure from the tool 22, in the direction of the arrow as shown in FIG. 2, to the wall member 30.

Once such push-out or bending occurs and forms the bent flange 26 shown in FIGS. 5-6, the fastener 20 must be removed for re-insertion into the flange 26, and the bent wall members 28, 30 of the flange 26 must be restored to their original shape as shown in FIGS. 1-2, or otherwise wastefully discarded and replaced with a new flange 10 and/or a new fastener 20, in order to provide a properly assembled and secure connection as shown in FIGS. 3-4. Otherwise, the joined flange and duct end assembly shown in FIGS. 5-6 will not be sufficiently secured, and may even be unsecured and thus useless for properly interconnecting ducts ends and components.

Remedying such bending, or in anticipation of bending, pre-clamping the assembly, increases the time to properly assemble the flanges to the duct members, and delays completion of the work. In addition, the inaccuracy and uncertainty of properly inserting the fastener 20 into the flange 26 and end portion 12 increases the chances for injuries due to the need for the duct assembler to manually stabilize both sides of the flange with one's hand near to the insertion point of the fastener 20, while the tool 20 applies the insertion pressure to the fastener 20.

There therefore exists a need exists for a simple and efficient method for securely mounting flanges to duct ends.

BRIEF SUMMARY OF THE INVENTION

A flange to be assembled to a duct member includes a plurality of pre-fabricated apertures or areas of weakened wall strength for receiving fasteners to assemble the flange to the end of a duct member. The apertures may be spaced apart such that the fasteners can be inserted at regular intervals along the length of the flange and the length of the end of the duct member.

BRIEF DESCRIPTION OF THE SEVERAL VIEWS OF THE DRAWINGS

Preferred embodiments of the invention are disclosed hereinbelow with reference to the drawings.

FIG. 3 is a left side cross-sectional view of the assembled flange and end portion.

FIG. 4 is a bottom top rear perspective view of the assembled flange and end portion.

FIGS. 9-13 are top front left side views of enlarged section of the flange of FIGS. 7-8 illustrating alternative embodiments of an aperture of the present invention.

DETAILED DESCRIPTION OF THE INVENTION

The prior art of FIGS. 1-6, having been previously generally described, FIGS. 7-17 describe a flange 34 and portions thereof according to the present invention provided to be assembled to an end portion 12 of a duct member.

Figure 7:
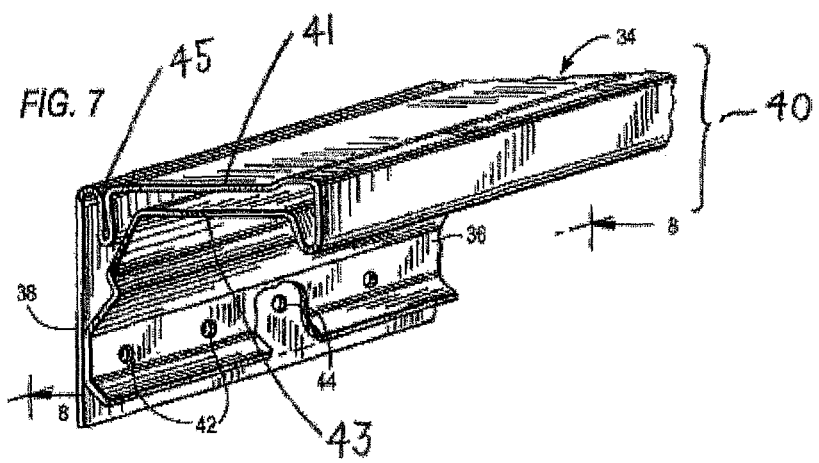
FIG. 7 is a top rear left side perspective view of a flange according to the present invention.
Figure 17:
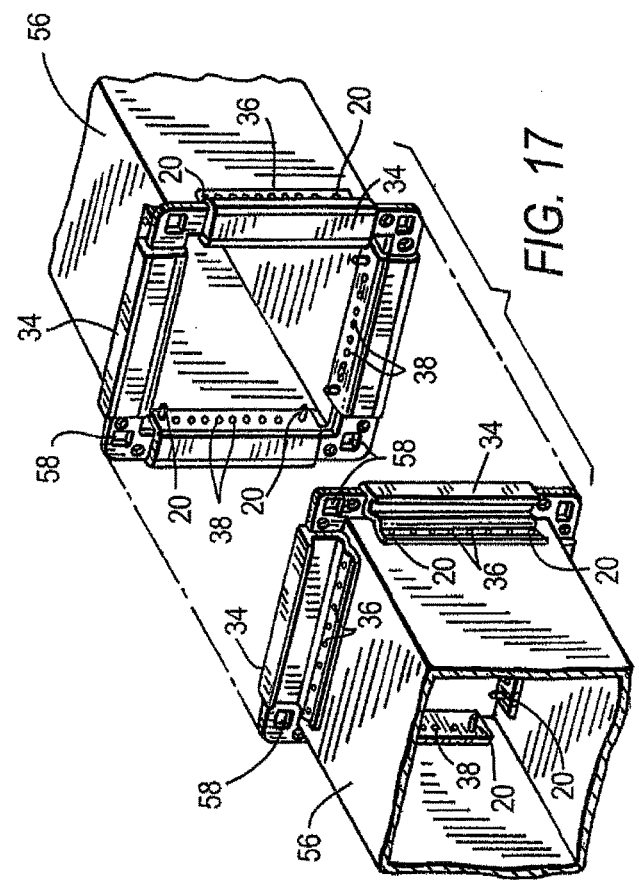
FIG. 17 is a top front perspective view of a pair of ducts having flange of the present invention mounted thereon for joining the ducts.

As shown in FIG. 7, an example embodiment of the present invention illustrates a flange 34 including at least a front wall member 36 (also referred to herein as an outer wall member 36) configured in a manner known in the art for joining adjacent flanges 34 together. For example, lateral ends of the front wall member 36 of the flange 34 may include corner sections and/or apertures known in the art, such as shown in FIG. 17 and described in greater detail in U.S. Pat. Nos. 4,288,115; 4,564,227; 4,725,083; 5,103,872; and 5,621,956, which are incorporated herein by reference. Such corner sections and/or apertures permit the flanges 34 secured to duct members to be assembled to join such duct members together in a manner known in the art. It is to be understood that the flange 34 may be of any size, shape, or configuration, such as flanges known in the art.

Figure 14:
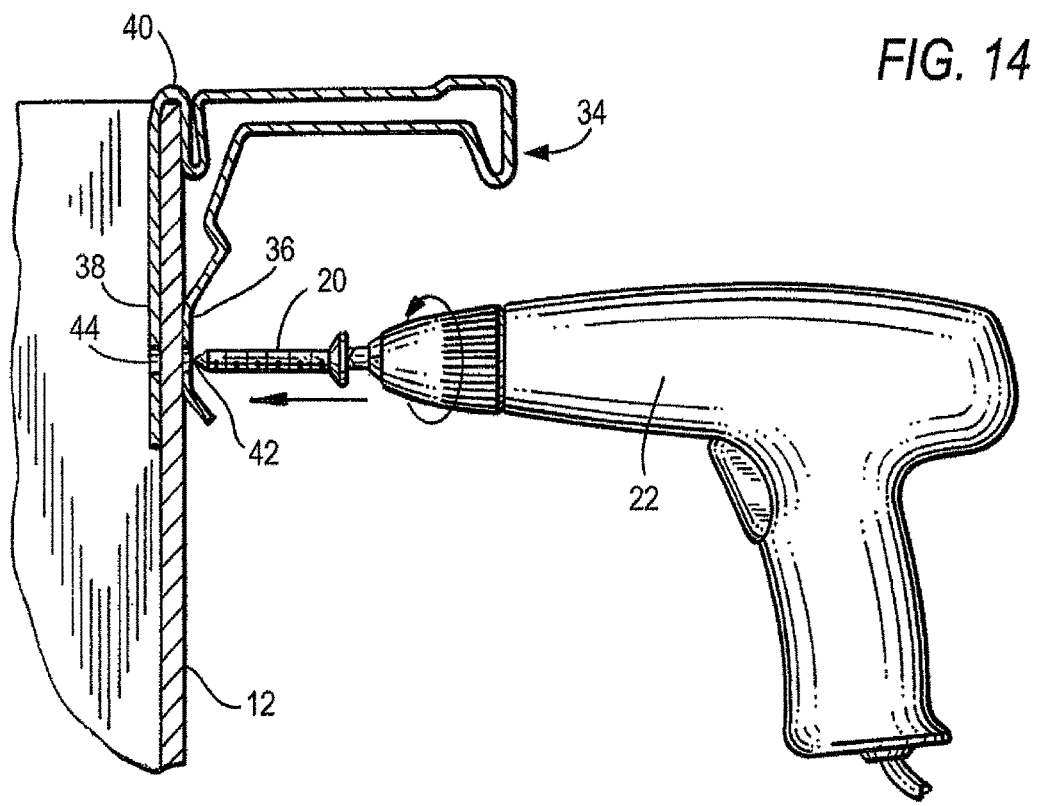
FIG. 14 is a left side cross-sectional view of the flange of FIGS. 7-8 adjacent to an end portion of a duct member prior to assembly.

In the example embodiment of the present invention shown in FIG. 7, the flange 34 also includes a rear wall member 38 (also referred to herein as an inner wall member 38), with the wall members 36, 38 joined by an intermediate member 40. The wall members 36, 38 of the flange 34 are adapted, as shown in FIG. 14, to receive an end portion 12 of a duct member between the wall members 36, 38, and with the front wall member 36 abutting the exterior surfaces of the end portion 12, such that the front wall member 36 is externally exposed. As can be seen from FIG. 7, the intermediate member 40 includes an inner flange panel 41 and an outer flange panel 43. The inner flange panel 41 and outer flange panel 43 are connected to one another. A rib 45 is formed in the inner flange panel 41. The rib 45 is disposed proximate the rear wall member 38, and is separated from the rear wall member 38 by a distance substantially equal to the thickness of the duct member (e.g., see FIGS. 14 and 15). The proximity of the rib 45 to the rear wall member 38 prevents deflection of the flange 34 and thus enables a secure fastening of the flange 34 to the end portion 12 of the duct member. The inner flange panel 41 and outer flange panel 43 are configured such that the flange 34 is shaped for receiving corner pieces 58 (e.g., see FIG. 17).

The flange 34 may be fabricated from metal, such as aluminum, stainless steel, or other known metals or alloys, by methods known in the art, such as by stamping.

In the example embodiment, the flange 34 shown in FIG. 7 includes fastener entry areas 42 on at least the front wall member 36. Alternatively, the flange 34 may also include such fastener entry areas 44 on the rear wall member 38, as illustrated in the cut-away portion of the front wall member 36 in FIG. 7, such that the fastener entry areas 42, 44 are complementary; that is, each fastener entry area 42 on the front wall member 36 is substantially aligned with a respective fastener entry area 44 on the rear wall member 38.

Accordingly, referring to FIG. 14, when an end portion 12 of a duct member is positioned in the gap between the wall members 36, 38, a pair of complementary fastener entry areas 42, 44 are positioned at substantially identical locations on opposite sides of the end portion 12.

Figure 8:
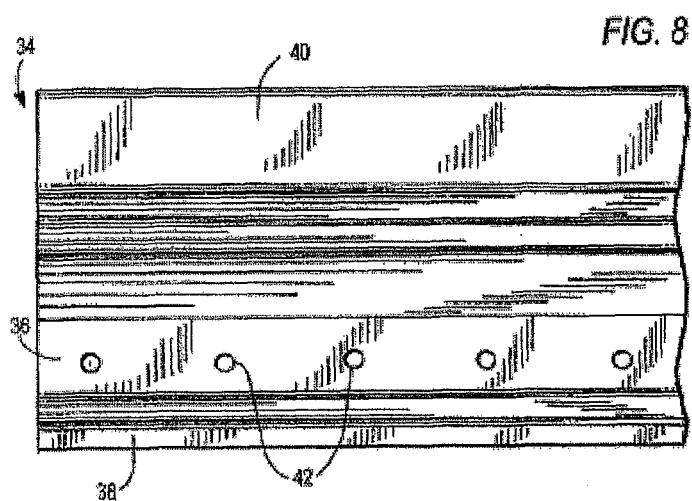
FIG. 8 is a front elevational view of the flange of FIG. 7 along lines 8-8 in FIG. 7.

As shown in FIGS. 7-8, a plurality of fastener entry areas 42, 44 are provided along the length of the flange 34 on each of the wall members 36, 38, respectively. In an example embodiment shown in FIG. 8, the plurality of fastener entry areas 42 are regularly spaced apart at predetermined equal distances along the length of the front wall member 36 of the flange 34. Similarly, the plurality of fastener entry areas 44 are regularly spaced apart at predetermined equal distances along the length of the rear wall member 38 of the flange 34.

In addition, the fastener entry areas 42, 44 may be spaced apart at predetermined metric distances, such as along one-centimeter intervals, or by predetermined English units, such as along one-inch intervals. The predetermined spacing permits an assembler to readily site one or more fastener entry areas 42, 44 at any selected distance, for example, from the corner of a duct, in order to meet predetermined specifications for assembly of the ducts. For example, an assembly specification may require a fastener 20 to be spaced at about two inches from a corner of a duct, so the flange 34 may be positioned along the end portion 12 to site a pair of fastener entry areas 42, 44 at two inches from the corner.

Referring to FIG. 9, in one example embodiment, each of the fastener entry areas 42, 44 on the wall members 36, 38 may be an aperture, forming a through hole 46, such as shown, for example, passing through the front wall member 36, with the through holes 46 being pre-fabricated apertures in the wall members 36, 38 for receiving fasteners to assemble the flange to the end of a duct member. The through holes 46 may be regularly spaced apart, as shown in FIG. 8, such that at least one fastener 20 can be inserted through the holes 46 at regular intervals along the length of the flange 34 and the length of the end portion 12 of the duct member.

Referring to FIG. 10, in another example embodiment, each of the fastener entry areas 42, 44 on the wall members 36, 38 may be an indentation 48, such as shown, for example, entering but not completely passing through the rear wall member 38, with the indentations 48 being pre-fabricated dimples or weakened points in the wall members 36, 38 for receiving fasteners to assemble the flange to the end of a duct member. The indentations 48 may be regularly spaced apart, as shown in FIG. 8, such that at least one fastener 20 can be inserted through the indentations 48 at regular intervals along the length of the flange 34 and the length of the end portion 12 of the duct member.

In another example, embodiment, the fastener entry areas 42 on the front wall member 36 may be through holes 46 as in FIG. 9, while the fastener entry areas 44 on the rear wall member 38 may be indentations 48 as in FIG. 10, or vice versa, to facilitate entry and passing through of the fastener 20 to assemble the flange 34 to the end portion 12, as described herein.

It is to be understood that the fastener entry areas 42, 44 on the wall members 36, 38 may be through holes or indentations of any shape, and not limited to circular holes 46 or indentations 48, as shown in the example embodiments in FIGS. 9-10. For example, in alternative embodiments shown in FIGS. 11-13, the fastener entry areas may be slots 50 forming an elongated hole having, for example, rounded ends, or may be a square hole 52 or a rectangular hole or slot 54. Such holes 50-54 may instead be replaced by indentations of similar shape. In the form of circular-ended slots 50 or rectangular slots 54 shown in FIGS. 11 and 13, respectively, the fastener entry areas 42, 44 facilitate entry of the fastener 20 therethrough even though the complementary fastener entry areas 42, 44 on opposite sides of the end portion 12 may not be perfectly aligned.

Referring to FIG. 14, during the mounting operation of the flange 34 to the end section 12, the flange 34 is positioned about the end portion 12, and with the fastener entry areas 42, 44 on either side of the end portion 12, with the fastener 20 oriented for insertion by the tool 22, and with the fastener entry areas 42, 44 being of any size and shape such as the shapes shown in FIGS. 9-13, and any configuration, such as any of the holes in FIGS. 9 and 11-13, being of any size, or an indentation of any size or shape such as the indentation 48 shown in FIG. 10. In the example shown in FIG. 14, the fastener entry areas 42, 44 are through holes in each respective wall member 36, 38, such as the holes 46 shown in FIG. 9. Alternatively, it is to be understood that the fastener entry areas 42, 44 on either side of the end portion 12 may be the indentations 48 shown in FIG. 10, or may also be a combination of through holes and indentations shown in FIGS. 9-13.

Figure 15:
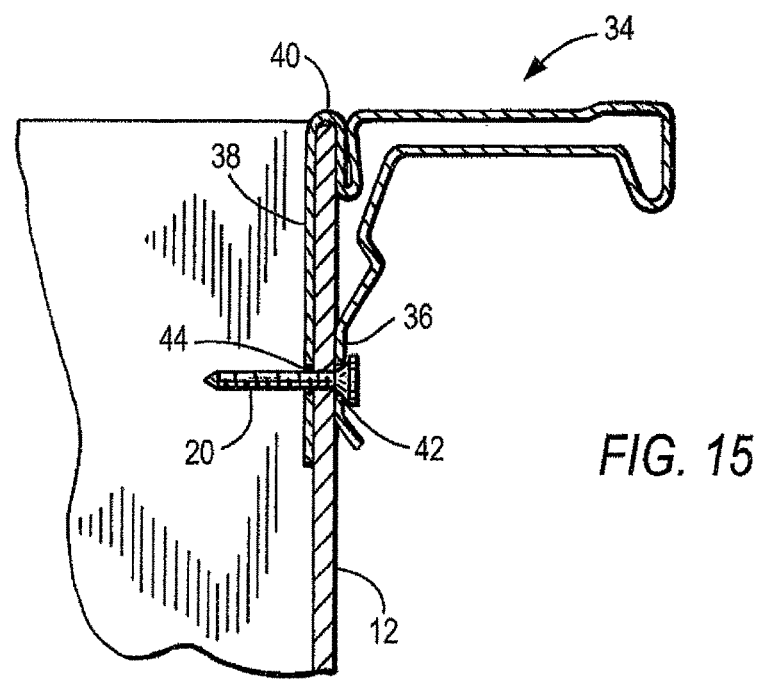
FIG. 15 is a left side cross-sectional view of the assembled end portion and flange of FIGS. 7-8.
Figure 16:
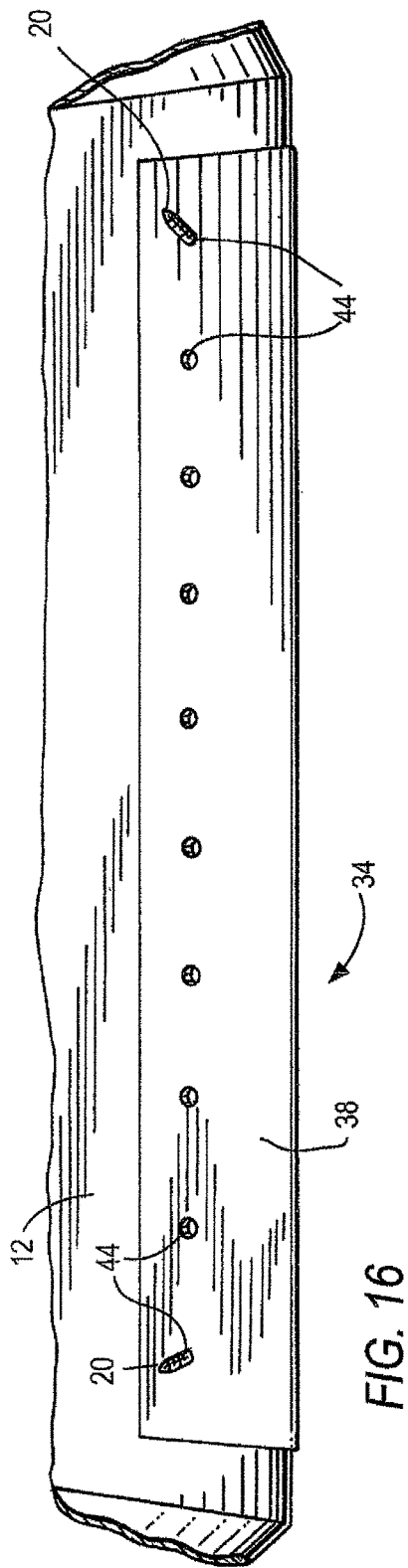
FIG. 16 is top rear elevational view of the assembled flange and end portion of FIG. 12.

With the fastener 20 positioned as shown in FIG. 14, the tool 22 more easily inserts the fastener 20 through the fastener entry areas 42, 44 and through the section of the end portion 12 between the fastener entry areas 42, 44 to form the assembled flange and end section shown in FIGS. 15-17.

Figure 1:
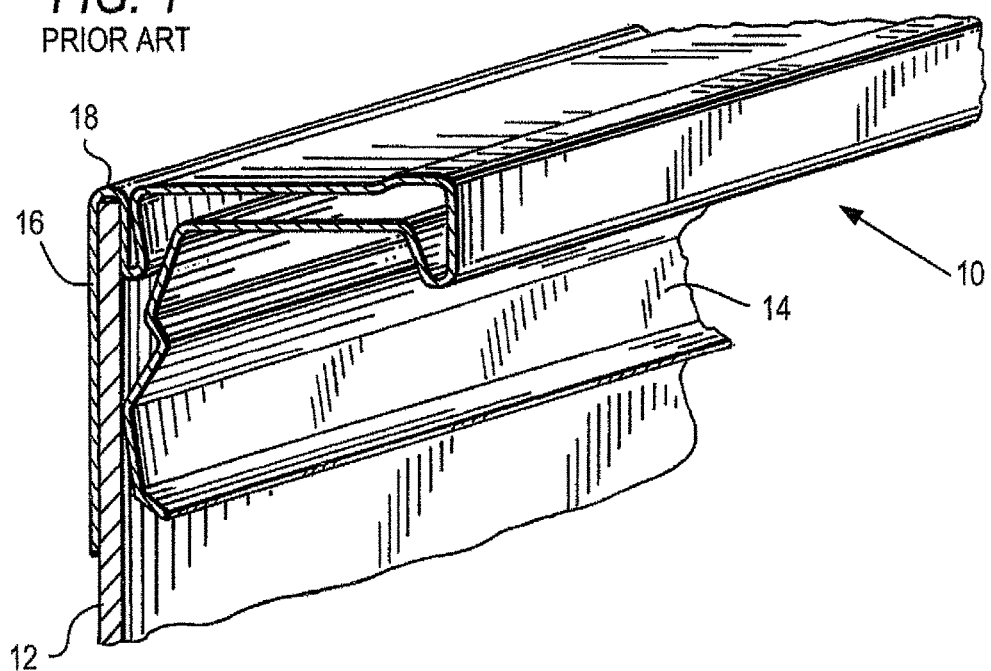
FIG. 1 is a top front left side perspective view of a flange and end portion of a duct member in the prior art.
Figure 2:
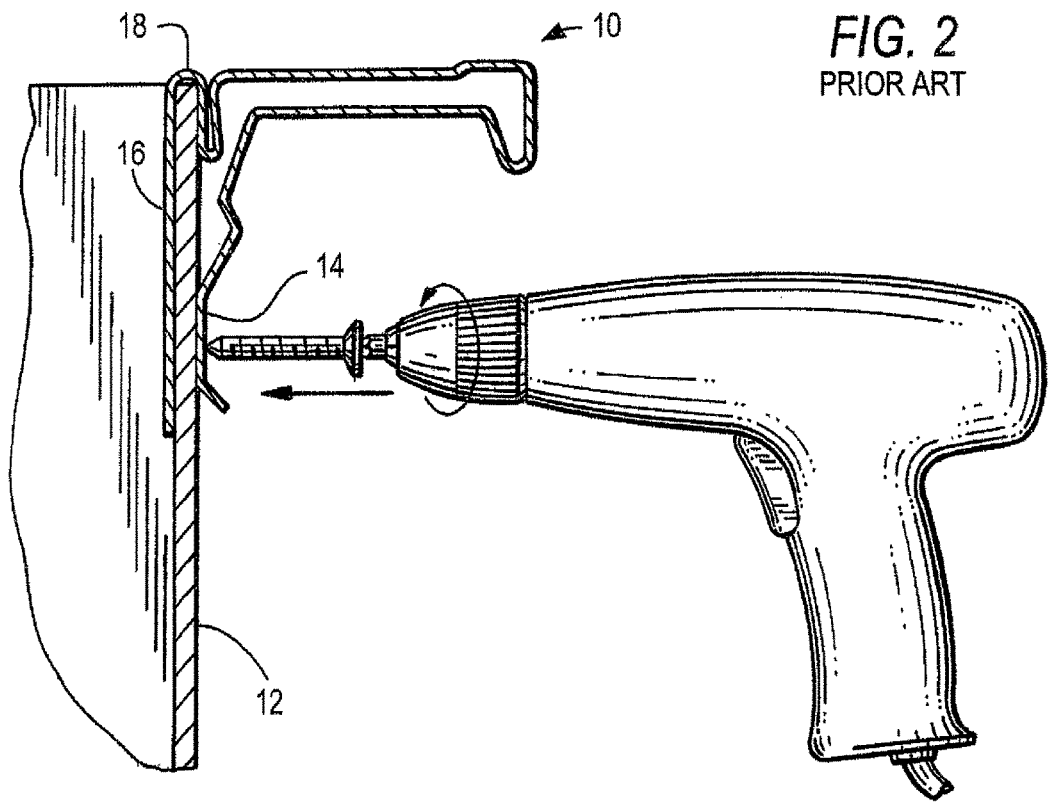
FIG. 2 is a left side cross-sectional view of the flange and end portion of FIG. 1, prior to assembly.
Figure 5:
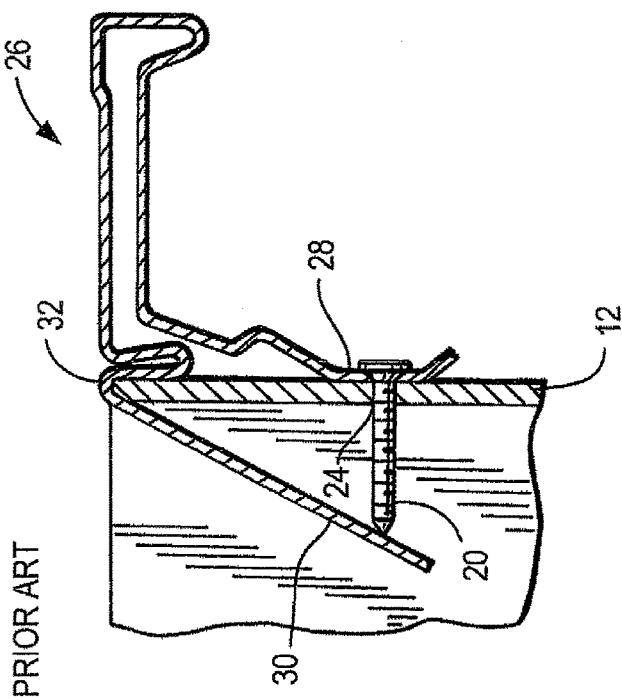
FIG. 5 is a left side cross-sectional view of an improperly assembled flange and end portion.
Figure 6:
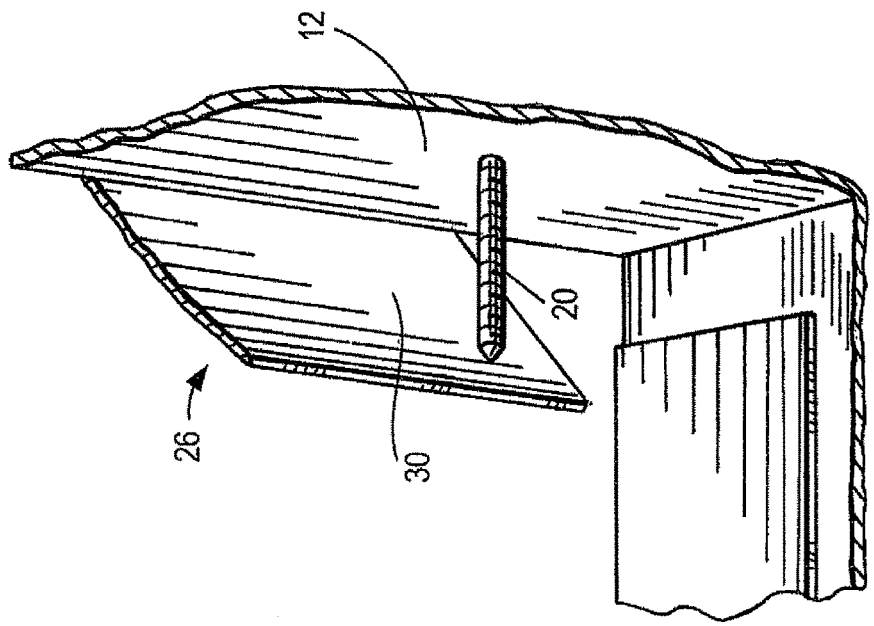
FIG. 6 is a bottom rear perspective view of the improperly assembled flange and end portion of FIG. 5.

By providing such fastener entry areas 42; 44, assembly of the final configuration shown in FIGS. 15-17 is performed more quickly, more effectively, and with less force and torque required by the tool 22. In addition, since the rear wall member 38 has a complementary fastener entry area 44 ready to receive the fastener 20 passing through the adjacent region of the end portion 12, there is little or no chance for the fastener 20 to apply force to the rear wall member 38, and so the rear wall member 38 will not be pushed out in an improper configuration as shown in FIGS. 5-6.

Accordingly. the final configuration of the flange 34 and the end portion 12 of the duct member may be assembled more rapidly and efficiently in the field with fewer or no mistakes requiring remedy. In effect, the effort to create the fastener entry areas 42, 44 is performed during fabrication of the flange 34, long before use and assembly in the field, so assemblers may complete their work more efficiently. As shown in FIG. 17, the combination of the flange 34 mounted to the end portion 12 of a duct member 56 can have corner pieces 58 mounted in adjoining flanges 34 on the corners of the ends of the duct member 56, in a manner similar to the use of corner pieces in the prior art. Pairs of duct members 56 having such mounted flanges 34 can then be assembled together, for example, by fastening complementary corner pieces 58 together.

In addition, since the fastener entry areas 42, 44 are regularly spaced along the length of the flange 34, the duct assembler in the field can readily locate multiple areas 42, 44 for inserting a predetermined number of fasteners 20 at any prescribed or required distance, for example, relative to a corner section of the duct member.

The material strength of the flange 34 is also maintained, since the fastener entry areas 42, 44 are relatively small in size compared to the overall dimensions of the flange 34. In addition, insertion of the fastener 20 through the flange 34 of the present invention will have less or no debris from the insertion point positioned between the flange 34 and the end portion 12, and so the assembled flange 34 and end portion 12 of FIGS. 15-17 will have a tighter fit compared to the assembly of the prior art shown in FIGS. 3-4.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

The invention claimed is:

1. A duct member panel flange, comprising:
   a first wall member;
   a second wall member, which wall members are configured to receive a duct member panel there between, wherein at least a portion of the first wall member and at least a portion of the second wall member extend substantially parallel one another;

an intermediate member connected to the first and second wall members; and a plurality of first pre-fabricated apertures disposed in the first wall member, and a plurality of second pre-fabricated apertures disposed in the second wall member, wherein the first pre-fabricated apertures are substantially aligned with the second pre-fabricated apertures.

2. The flange of claim 1, wherein the intermediate member includes a rib disposed proximate the first wall member.

3. The flange of claim 2, wherein the intermediate member includes a first flange panel connected to a second flange panel, and first flange panel includes the rib.

4. The flange of claim 3, wherein the rib extends outwardly from the first flange panel in a direction that is substantially parallel to the first wall member, and is spaced apart from the first wall member.

5. The flange of claim 1, wherein the plurality of first pre-fabricated apertures are disposed in the portion of the first wall member that is substantially parallel the second wall member, and the plurality of second pre-fabricated apertures are disposed in the portion of the second wall member that is substantially parallel the first wall member.

6. The flange of claim 1, wherein the first pre-fabricated apertures and the second pre-fabricated apertures are configured the same.

7. The flange of claim 1, wherein the plurality of first pre-fabricated fastener entry areas are disposed in the portion of the first wall member that is substantially parallel the second wall member, and the plurality of second pre-fabricated fastener entry areas are disposed in the portion of the second wall member that is substantially parallel the first wall member.

8. A method for manufacturing a duct member panel flange, comprising:

forming a flange into a unitary configuration that includes a first wall member, a second wall member, and an intermediate member connected to the first and second wall members, which intermediate member includes a rib disposed proximate the first wall member, wherein at least a portion of the first wall member and at least a portion of the second wall member extend substantially parallel one another;

forming a plurality of first pre-fabricated apertures within the first wall member; and forming a plurality of second pre-fabricated apertures disposed in the second wall member, wherein the first pre-fabricated apertures are substantially aligned with the second pre-fabricated apertures;

wherein the plurality of first pre-fabricated apertures are disposed in the portion of the first wall member that is substantially parallel the second wall member, and the plurality of second pre-fabricated apertures are disposed in the portion of the second wall member that is substantially parallel the first wall member.

9. The method of claim 8, wherein the step of forming the flange into the unitary configuration includes forming the intermediate member to include a first flange panel connected to a second flange panel, and the rib extending outwardly from first flange panel.

10. The method of 9, wherein the step of forming the flange into the unitary configuration includes forming the rib to extend outwardly from the first flange panel in a direction that is substantially parallel to the first wall member, and is spaced apart from the first wall member.

11. A duct member panel flange, comprising:

a first wall member;

a second wall member, which wall members are configured to receive a duct member panel there between, wherein at least a portion of the first wall member and at least a portion of the second wall member extend substantially parallel one another;

an intermediate member connected to the first and second wall members; and a plurality of first pre-fabricated fastener entry areas in the first wall member, and a plurality of second pre-fabricated fastener entry areas in the second wall member, wherein the first pre-fabricated fastener entry areas are substantially aligned with the second pre-fabricated fastener entry areas.

12. The flange of claim 11, wherein the first pre-fabricated fastener entry areas are apertures or indentations, or some combination thereof.

13. The flange of claim 11, wherein the second pre-fabricated fastener entry areas are apertures or indentations, or some combination thereof.

14. The flange of claim 11, wherein the intermediate member includes a rib disposed proximate the first wall member.

15. The flange of claim 14, wherein the intermediate member includes a first flange panel connected to a second flange panel, and first flange panel includes the rib.

16. The flange of claim 15, wherein the rib extends outwardly from the first flange panel in a direction that is substantially parallel to the first wall member, and is spaced apart from the first wall member.

17. A duct member panel flange, comprising:

a first wall member;

a second wall member, which wall members are configured to receive a duct member panel there between, wherein at least a portion of the first wall member and at least a portion of the second wall member extend substantially parallel one another;

an intermediate member connected to the first and second wall members; and a plurality of pre-fabricated fastener entry areas in at least one of the first wall member or the second wall member.

18. The flange of claim 17, wherein the pre-fabricated fastener entry areas are apertures or indentations, or some combination thereof.

19. The flange of claim 17, wherein the intermediate member includes a first flange panel connected to a second flange panel, wherein at least a portion of the first flange panel and at least a portion of the second flange panel extend substantially parallel one another, and a plurality of pre-fabricated fastener entry areas disposed in at least one of the first flange panel or the second flange panel.

* * * * *